United States Patent
Trigell et al.

[19]

[11] Patent Number: 6,112,948
[45] Date of Patent: Sep. 5, 2000

[54] BEVERAGE DISPENSER

[75] Inventors: Derek Edwin Trigell; Gary Stuart Jennings, both of Devon, United Kingdom

[73] Assignee: Premark International Inc., Deerfield, Ill.

[21] Appl. No.: 09/243,902

[22] Filed: Feb. 3, 1999

[30] Foreign Application Priority Data

May 2, 1998 [GB] United Kingdom .................... 9802537

[51] Int. Cl.⁷ ....................................... B67D 5/56
[52] U.S. Cl. ......................... 222/132; 222/320; 222/537; 141/284
[58] Field of Search ............................ 141/284; 99/306; 222/132, 526, 537, 320

[56] References Cited

U.S. PATENT DOCUMENTS

| | | | |
|---|---|---|---|
| 1,279,161 | 9/1918 | Rogers | 141/284 X |
| 2,717,112 | 9/1955 | Ralston | 141/248 X |
| 2,938,551 | 5/1960 | Hallstein | 141/248 X |
| 3,207,376 | 9/1965 | Molitor | 222/320 X |
| 4,274,453 | 6/1981 | Lee | 141/248 X |
| 4,927,060 | 5/1990 | Snowball et al. | 222/132 X |
| 5,743,432 | 4/1998 | Barbe | 222/132 X |
| 5,881,913 | 3/1999 | Boulter | 222/320 X |

FOREIGN PATENT DOCUMENTS

| | | |
|---|---|---|
| 0151500 | 8/1985 | European Pat. Off. . |
| 0422499 | 4/1991 | European Pat. Off. . |
| 0737434 | 10/1996 | European Pat. Off. . |
| 2025958 | 12/1974 | Germany . |
| 8615604 | 3/1987 | Germany . |
| 100112 | 9/1987 | Germany . |
| 29605389 | 8/1996 | Germany . |
| 985841 | 3/1965 | United Kingdom . |
| 1545298 | 5/1979 | United Kingdom ........... B65D 25/40 |

Primary Examiner—Kenneth Bomberg
Attorney, Agent, or Firm—Wood, Herron & Evans, LLP

[57] ABSTRACT

A beverage dispenser comprising a dispenser body, the dispenser being operable to dispense a beverage via at least one outlet accessible externally of the dispenser body is described. The at least one outlet may be supported with respect to the dispenser body such that its position relative to the body can be set by a user to select one of at least two different vertical heights at which dispensing is to take place. Alternatively or additionally the dispenser may have two outlets supported with respect to the dispenser body such as to be at different vertical heights so that the user can select the vertical height at which dispensing is to take place by selection of the respective outlet.

8 Claims, 4 Drawing Sheets

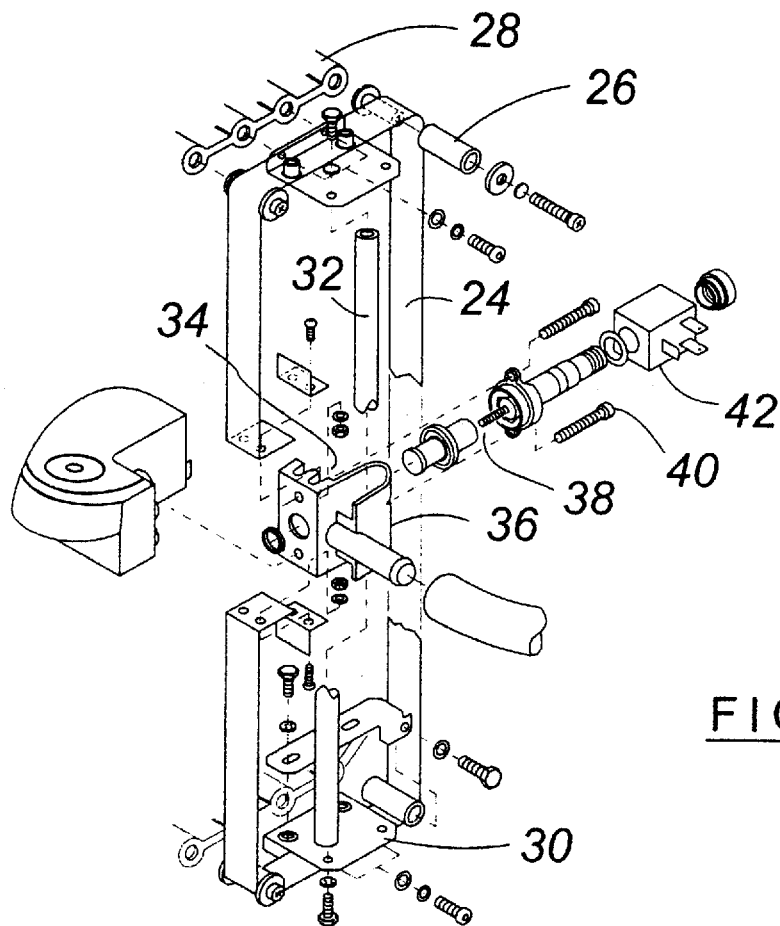
FIG. 5
FIG. 6
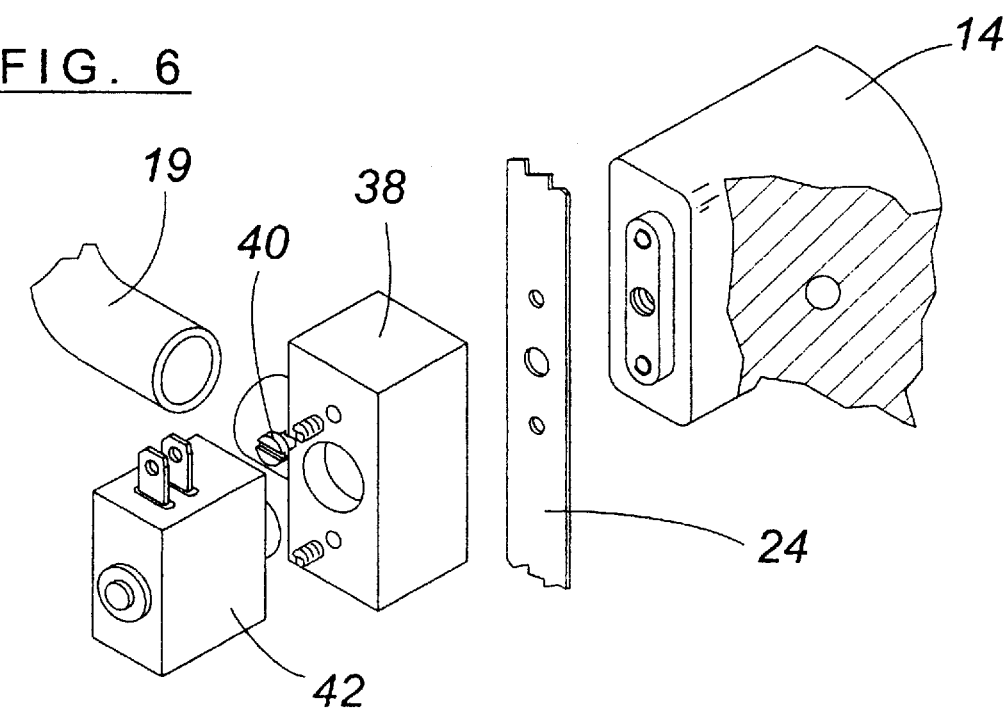

6,112,948

1

BEVERAGE DISPENSER

The present invention relates to a beverage dispenser and in particular to a dispenser used to provide hot beverages such as tea or coffee.

Known coffee brewers include at least one storage urn from which brewed coffee is dispensed via a tap. The height of the tap is fixed. Accordingly, if coffee is to be dispensed into a container of similar height, then the container can simply be placed below the tap. However, if the height of the container is significantly different, then either it has to be tilted, if it is too tall, or it has to be held in the hand or rested on a raised platform, if it is too short, in order to avoid splashing or spillage of coffee.

The present invention provides a beverage dispenser which in one aspect comprises a dispenser body, the dispenser being operable to dispense a beverage via at least one outlet accessible externally of the dispenser body, wherein the at least one outlet is supported with respect to the dispenser body such that its position relative to the body can be set by a user to select from at least two different vertical heights, that at which dispensing is to take place.

In accordance with another aspect of the invention there is provided a beverage dispenser comprising a dispenser body, the dispenser being operable to selectively dispense a beverage via at least two outlets accessible externally of the dispenser body, wherein the outlets are supported with respect to the dispenser body such that they are at different vertical heights so that a user can select the height at which dispensing is to take place by selection of the respective outlet.

A dispenser of the invention allows beverages to be dispensed conveniently and safely into containers of different heights, in particular it is able to accommodate both a bulk container for holding sufficient beverage for several people and a smaller container, such as a cup or a mug, for holding sufficient beverage for one person. This may be achieved through use of a single outlet with the first aspect and with two outlets in the second aspect.

Preferably beverage is fed to the at least one outlet by a flexible tube. This allows use of a fixed storage urn for the beverage within the body of the beverage dispenser.

Suitably the at least one outlet is movable along a substantially vertical slot formed in the body of the dispenser. The outlet is thereby guided between the different heights.

Preferably the at least one outlet is carried on a manually operated lift mechanism provided internally of the dispenser body. A preferred form for the lift mechanism is a movable band on which the at least one outlet is carried. The band may be arranged to cover the slot above and below the at least one outlet. The band will therefore serve to minimise the ingress of dust into the body of the dispenser. The band may be arranged in the form of an essentially closed loop so it can be readily mounted within the dispenser body.

As the dispenser can be used to fill containers of different heights which are therefore likely to have different capacities, it may suitably be operable to dispense a range of predetermined volumes of beverage. In such a configuration, beverage is preferably fed to the at least one outlet via a solenoid valve which can readily be controlled to provide a predetermined volume range.

The invention will now be further described by way of example and reference to the accompanying drawings in which:

FIG. 1 is a prospective view of a beverage dispenser according to the present invention;

2

FIG. 5 is an exploded prospective view of a first embodiment of an outlet of the dispenser of FIG. 1, and, FIG. 6 is an exploded prospective view of an alternative outlet for the dispenser of FIG. 1.

Figure 1:
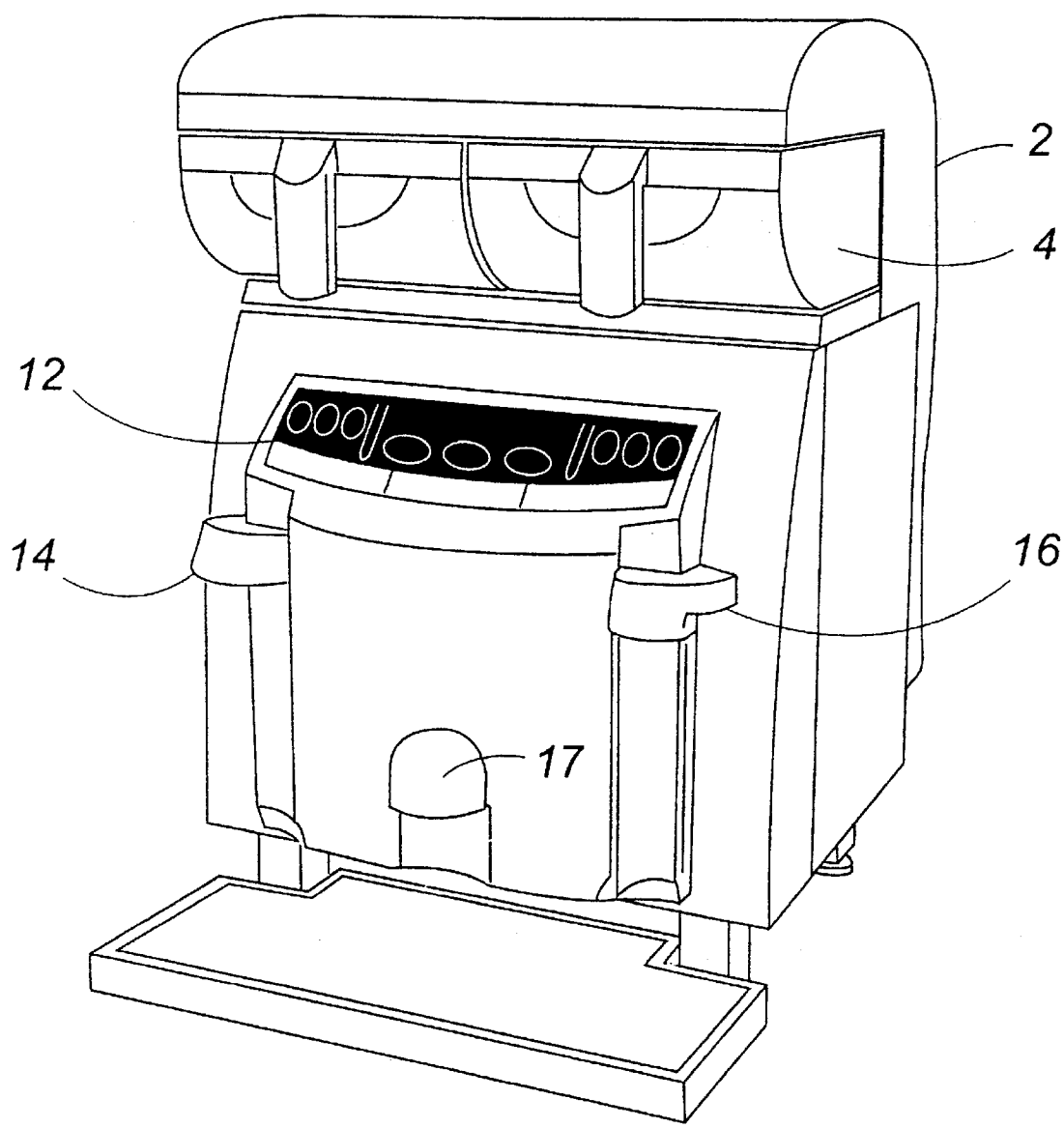
Figure 2:
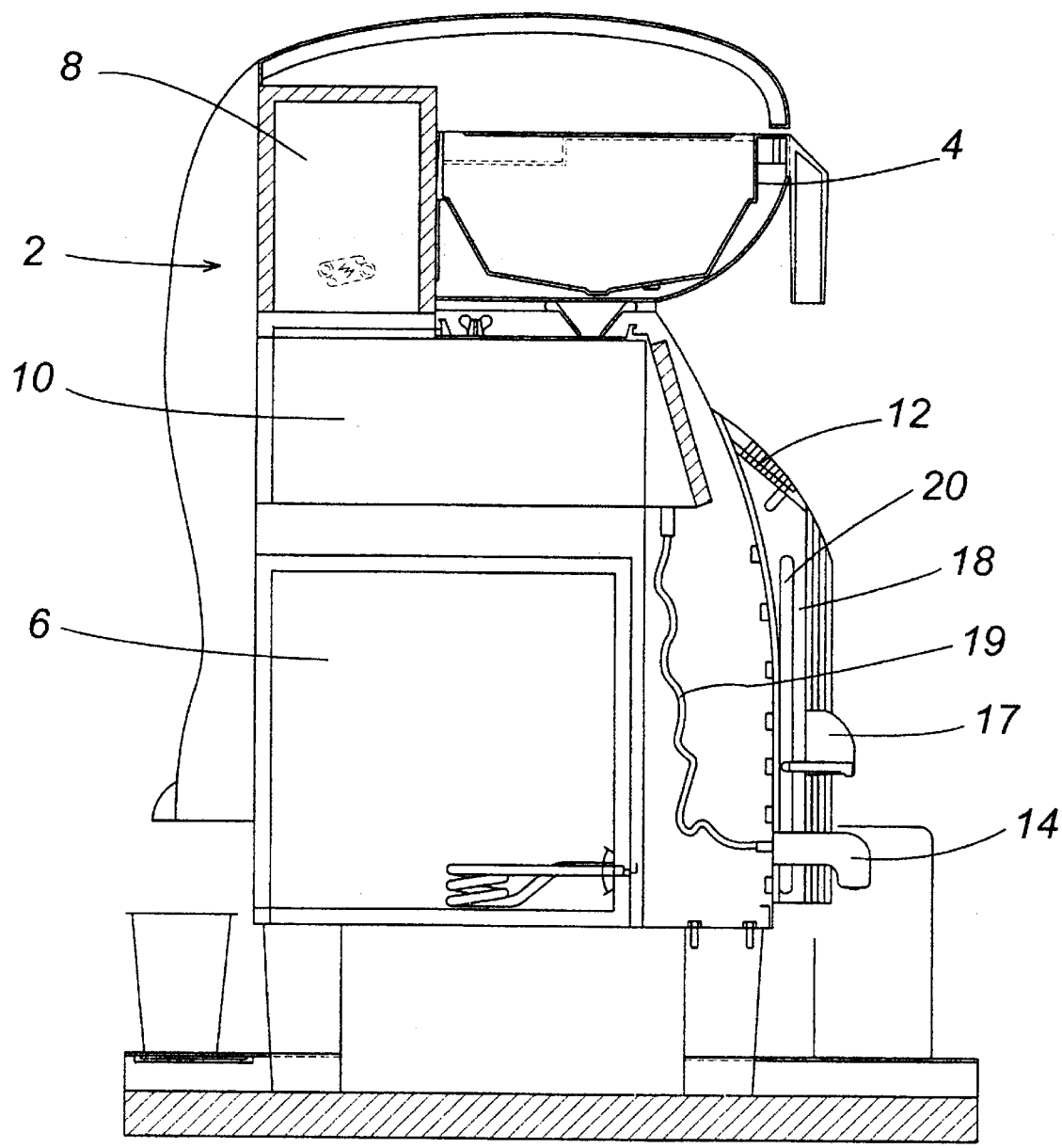
FIG. 2 is a part sectional side view on the dispenser of FIG. 1.

The dispenser shown in FIG. 1 comprises a housing 2 supporting two removable filter pans 4 for holding ground coffee or tea leaves, for example, within filter papers. It also includes two hot water tanks 6 (only one shown) to heat water for use in beverage preparation, a smaller hot water tank 8 for supplying hot water to a user and two beverage storage tanks 10 (only one shown). The dispenser is operable by a user via a control panel 12.

When the dispenser is initially activated water is heated in the hot water tanks 6 and 8. To prepare a beverage such as coffee or tea, a predetermined volume of hot water is fed from one of the hot water tanks 6 via a filter pan 4 into one of the beverage storage tanks 10. The beverage passes from the filter pan 4 to the storage tank 10 via a hole (not shown) in the base of the filter pan 4. The dispenser is then able to dispense either the prepared beverage from the storage tank 10 or hot water from the smaller hot water tank 8. It should be appreciated therefore that the term "beverage" as used herein encompasses not only prepared beverages such as coffee and tea, but also water as supplied for preparation of a beverage by a user, or for direct drinking.

The beverage dispenser is provided with two movable outlets in the form of taps 14 and 16 for beverage from the storage tanks 10 and a fixed outlet 17 for hot water from the smaller hot water tank 8.

The taps 14 and 16 are slidably mounted on vertical tracks 18 provided on the front of the housing 2. Beverage is fed to the taps 14, 16 via flexible tubes 19 and through vertical slots 20 in the front wall of the housing 2. The taps 14 and 16 may be such as to be manually operable to dispense prepared beverage. Preferably, however, as described below a mechanism is provided to the rear of the front cover 21 of the dispenser which is operable in accordance with commands entered by a user via the control panel 12 for dispensing a predetermined volume of prepared beverage via each tap 14, 16.

Figures 3, 4:
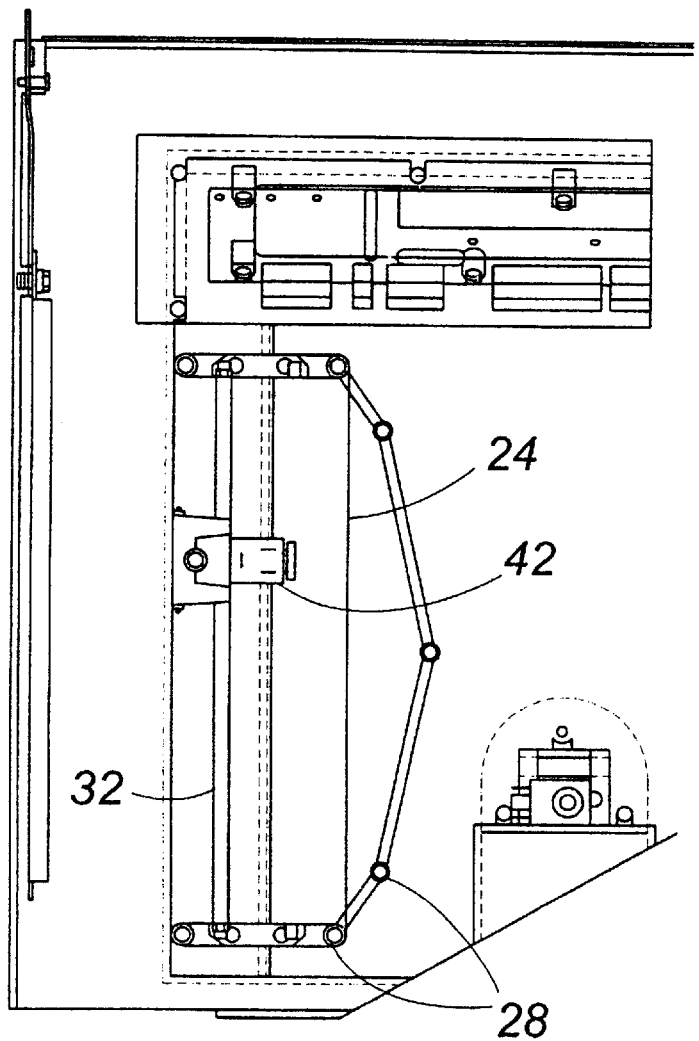
FIG. 3 is a sectional front view of part of the dispenser of FIG. 1.
FIG. 4 is a sectional plan view of part of the dispenser of FIG. 1.

A lift mechanism is provided for each of the movable taps 14 and 16. FIGS. 3 to 5 show one embodiment of a suitable lift mechanism as employed for tap 14, FIG. 3 and tap 16, FIGS. 4 and 5. The lift mechanism includes a band 24 carried on four rollers 26 which define an essentially rectangular path for movement of the band 24. One or more of the rollers 26 may be adjustable to facilitate fitting of the band 24 and/or varying its tension. The band 24 is suitably constituted by a rubber belt.

The front cover 21 of the dispenser includes sockets 28 for mounting of the rollers 26 by bolting thereto. Sockets 28 are also provided for attachment of an upper and lower mounting plate 30 between which is supported a guide rod 32 positioned in use behind the band 24.

The guide rod 32 serves to guide the movement of a valve body member 34 in a vertical path. The valve body member 34 has two arms, one for connection to the tap 14 or 16 and the other for connection to the flexible tube 19 leading to the respective tank 10. Integrally formed with the second arm is a bracket 36 which engages the guide rod 32. A solenoid valve 38 is mounted to the valve body member 34 between the two arms and controls the transfer of beverage from the flexible tube 19 to the tap 14 or 16. The solenoid valve 38 is mounted to the body member 34 by fixing screws 40 and includes at its rear end an energizing coil 42. The ends of the band 24 are connected to the outlet 34 above and below the arm to which the tap 14 or 16 is mounted. The band 24 is therefore effectively continuous. However, the band 24 could comprise a length wound at each end on rollers into a reel. It will be noted that the band 24 is arranged to close the slot 20 extending above and below each tap 14, 16 and thus to minimise ingress of dust or other extraneous matter through the slot 20 and into the housing 2.

The embodiment illustrated in FIG. 6 is in many ways similar to that of FIGS. 2 to 5 and so like reference numerals will be used for like parts. The band 24 is completely continuous and also serves to provide a seal between the tap 14, 16 and solenoid valve 38. In this case the fixing screws 40 pass through the and into the tap 14, 16 clamp the band 24 between the solenoid valve 38 and the tap 14, 16.

The taps 14, 16 may be manually moved to the desired position or alternatively a motorised drive can be provided for the band 24 which can suitably be arranged to move each tap in a number of specific predetermined positions at different vertical heights. In the latter case the position and thence the height could be used to control the solenoid valve 38 to cause dispensation of an appropriate volume of beverage.

The fixed tap 17 is also provided with a control comprising a solenoid valve 38 suitably with the illustrated embodiment arranged to dispense a cup's worth of hot water.

What is claimed is:

1. A beverage dispenser comprising a dispenser body, the dispenser body being operable to dispense a beverage via at least one outlet accessible externally of the dispenser body, wherein the at least one of the outlets is carried on a lift mechanism provided internally of the dispenser body and is movable along a substantially vertical slot formed in the body of the dispenser such that its position relative the body can be set by a user to select from at least two different vertical heights that at which dispensing is to take place and wherein the lift mechanism is a movable band which covers the slot above and below the at least one outlet.

2. A dispenser as claimed in claim 1 wherein the beverage is fed to the at least one outlet via a flexible tube.

3. A dispenser as claimed in claim 1 wherein dispensing is controlled by a solenoid valve at the at least one outlet.

4. A dispenser as claimed in claim 1 whereas the dispenser is operable to dispense at least one predetermined volume of beverage at the at least one outlet.

5. A beverage dispenser comprising a dispenser body, the dispenser being operable to selectively dispense a beverage via at least two outlets accessible externally of a dispenser body, wherein the outlets are supported with respect to the dispenser body such that they are at different vertical heights so that a user can select the height at which dispensing is to take place by selection of the respective outlet wherein at least one of the outlets is carried on a lift mechanism provided internally of the dispenser body and is movable along a substantially vertical slot formed in the body of the dispenser, such that the position of the at least one outlet relative to the body can be set by a user to select from at least two different vertical heights that at which dispensing is to take place from the at least one outlet, and wherein the lift mechanism is a movable band which covers the slot above and below the at least one outlet.

6. A dispenser as claimed in claim 5 wherein the beverage is fed to the at least one outlet via a flexible tube.

7. A dispenser as claimed in claim 5 wherein dispensing is controlled by a solenoid valve at each outlet.

8. A dispenser as claimed in claim 5 whereas the dispenser is operable to dispense at least one predetermined volume of beverage at each outlet.

* * * * *

UNITED STATES PATENT AND TRADEMARK OFFICE
CERTIFICATE OF CORRECTION

PATENT NO : 6,112,948
DATED : September 5, 2000
INVENTOR(S) : Trigell et al.

It is certified that error appears in the above-identified patent and that said Letters Patent are hereby corrected as shown below:

The Priority Claim on the front of the patent reads, "May 2, 1998", and should read--February 5, 1998--.

Signed and Sealed this

First Day of May, 2001

Attest:

NICHOLAS P. GODICI

*Attesting Officer*     *Acting Director of the United States Patent and Trademark Office*